United States Patent
Linvill

(10) Patent No.: US 11,900,218 B2
(45) Date of Patent: Feb. 13, 2024

(54) QUANTUM FORMULATION INDEPENDENT SOLVER

(71) Applicant: Accenture Global Solutions Limited, Dublin (IE)

(72) Inventor: Kirby Linvill, Santa Clara, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 18/089,855

(22) Filed: Dec. 28, 2022

(65) Prior Publication Data

US 2023/0214698 A1    Jul. 6, 2023

Related U.S. Application Data

(63) Continuation of application No. 16/038,433, filed on Jul. 18, 2018, now Pat. No. 11,568,293.

(51) Int. Cl.
*G06N 10/00*    (2022.01)
*G06N 20/00*    (2019.01)
(Continued)

(52) U.S. Cl.
CPC ............ *G06N 10/00* (2019.01); *G06N 10/20* (2022.01); *G06N 10/40* (2022.01); *G06N 10/60* (2022.01);
(Continued)

(58) Field of Classification Search
CPC ........ G06N 10/00; G06N 10/20; G06N 10/40; G06N 10/60; G06N 10/80; G06N 20/00
See application file for complete search history.

(56) References Cited

U.S. PATENT DOCUMENTS 8,897,449 B1 * 11/2014 Broadbent ............ H04L 9/0891
                                              380/278
10,229,355 B2    3/2019 Ronagh et al.
(Continued)

FOREIGN PATENT DOCUMENTS

CN         109213603       1/2019
WO      WO 2018/119522     7/2018

OTHER PUBLICATIONS

Djijjev et al., "Efficient Combinatorial Optimization Using Quantum Annealing" Jan. 30, 2018, arXiv: 1801.08653v2, pp. 1-25. (Year: 2018).*

(Continued)

*Primary Examiner* — Vincent Gonzales
*Assistant Examiner* — Chase P. Hinckley
(74) *Attorney, Agent, or Firm* — Fish & Richardson P.C.

(57) ABSTRACT

Methods, systems, and apparatus for solving computational tasks using quantum computing resources. In one aspect a method includes receiving, at a quantum formulation solver, data representing a computational task to be performed; deriving, by the quantum formulation solver, a formulation of the data representing the computational task that is formulated for a selected type of quantum computing resource; routing, by the quantum formulation solver, the formulation of the data representing the computational task to a quantum computing resource of the selected type to obtain data representing a solution to the computational task; generating, at the quantum formulation solver, output data including data representing a solution to the computational task; and receiving, at a broker, the output data and generating one or more actions to be taken based on the output data.

12 Claims, 4 Drawing Sheets

(51) Int. Cl.
*G06N 10/80* (2022.01)
*G06N 10/20* (2022.01)
*G06N 10/60* (2022.01)
*G06N 10/40* (2022.01)
*G06N 7/00* (2023.01)

(52) U.S. Cl.
CPC ............. *G06N 10/80* (2022.01); *G06N 20/00* (2019.01); *G06N 7/00* (2013.01)

(56) References Cited

U.S. PATENT DOCUMENTS

| | | | |
|---|---|---|---|
| 10,275,721 | B2 | 4/2019 | Dukatz et al. |
| 10,484,479 | B2 | 11/2019 | Johnson et al. |
| 10,510,015 | B2 | 12/2019 | Mohseni et al. |
| 10,592,816 | B1 | 3/2020 | Hsu et al. |
| 10,664,762 | B2 | 5/2020 | Gambetta et al. |
| 10,713,582 | B2 | 7/2020 | Dadashikelayeh |
| 10,733,877 | B2 | 8/2020 | Neukart et al. |
| 10,817,337 | B1* | 10/2020 | Richardson ............ G06F 9/5005 |
| 10,846,366 | B1 | 11/2020 | Otterbach et al. |
| 10,872,021 | B1 | 12/2020 | Tezak et al. |
| 10,929,576 | B2 | 2/2021 | Ronagh et al. |
| 11,010,145 | B1* | 5/2021 | Smith ..................... G06N 10/00 |
| 11,049,035 | B2 | 6/2021 | Horesh et al. |
| 11,120,357 | B2 | 9/2021 | Zeng et al. |
| 11,250,190 | B2* | 2/2022 | Pednault .................. G06F 30/33 |
| 11,270,220 | B1* | 3/2022 | Richardson ............ G06F 9/5072 |
| 11,334,693 | B1 | 5/2022 | Flammia |
| 11,551,127 | B1* | 1/2023 | Otterbach .............. G06N 10/00 |
| 11,568,293 | B2 | 1/2023 | Linvill |
| 11,580,438 | B1* | 2/2023 | McMahon ............. G06N 10/20 |
| 2015/0317558 | A1* | 11/2015 | Adachi ................... G06N 3/04 706/19 |
| 2017/0011305 | A1 | 1/2017 | Williams |
| 2017/0083841 | A1 | 3/2017 | Syrichas et al. |
| 2017/0140325 | A1 | 5/2017 | Syrichas et al. |
| 2017/0177544 | A1 | 6/2017 | Zaribafiyan et al. |
| 2017/0223094 | A1* | 8/2017 | Johnson ................. G06N 10/00 |
| 2017/0255629 | A1 | 9/2017 | Thom et al. |
| 2017/0255872 | A1 | 9/2017 | Hamze et al. |
| 2017/0300817 | A1 | 10/2017 | King et al. |
| 2017/0330101 | A1 | 11/2017 | Hastings et al. |
| 2017/0357539 | A1 | 12/2017 | Dadashikelayeh et al. |
| 2017/0372427 | A1 | 12/2017 | Johnson et al. |
| 2018/0137192 | A1 | 5/2018 | Zaribafiyan et al. |
| 2018/0246851 | A1* | 8/2018 | Zaribafiyan ......... G06F 9/30018 |
| 2018/0308007 | A1 | 10/2018 | Amin et al. |
| 2018/0349282 | A1 | 12/2018 | Brahm et al. |
| 2019/0026645 | A1* | 1/2019 | Correll ............... G05B 23/0278 |
| 2019/0042392 | A1 | 2/2019 | Matsuura et al. |
| 2019/0080256 | A1 | 3/2019 | Irwin |
| 2019/0087388 | A1 | 3/2019 | Venturelli et al. |
| 2019/0095811 | A1 | 3/2019 | Antonio et al. |
| 2019/0102220 | A1 | 4/2019 | Bishop et al. |
| 2019/0102353 | A1 | 4/2019 | Adame et al. |
| 2019/0164034 | A1 | 5/2019 | Gambetta et al. |
| 2019/0220771 | A1 | 7/2019 | Boothby et al. |
| 2019/0258952 | A1 | 8/2019 | Denchev |
| 2019/0325336 | A1 | 10/2019 | Reilly |
| 2019/0332731 | A1 | 10/2019 | Chen et al. |
| 2019/0347575 | A1 | 11/2019 | Pednault et al. |
| 2019/0378025 | A1 | 12/2019 | Corcoles-Gonzalez et al. |
| 2019/0391807 | A1 | 12/2019 | Inagaki et al. |
| 2019/0392352 | A1 | 12/2019 | Lampert et al. |
| 2020/0019885 | A1 | 1/2020 | Takemoto et al. |
| 2020/0027029 | A1 | 1/2020 | Linvill |
| 2020/0169396 | A1 | 5/2020 | Neven et al. |
| 2020/0175413 | A1 | 6/2020 | Hsu et al. |
| 2020/0274554 | A1 | 8/2020 | Aspuru-Guzik et al. |
| 2020/0410384 | A1 | 12/2020 | Aspuru-Guzik et al. |
| 2021/0035005 | A1 | 2/2021 | Martinis et al. |
| 2021/0166148 | A1* | 6/2021 | Matsuura ............... G06N 10/00 |
| 2021/0232960 | A1 | 7/2021 | Scott N et al. |
| 2021/0272003 | A1* | 9/2021 | Rigetti ................... G06F 9/544 |
| 2021/0279260 | A1 | 9/2021 | Oberoi et al. |
| 2023/0023333 | A1* | 1/2023 | Naveh ..................... G06F 3/016 |

OTHER PUBLICATIONS

Lao et al., "Mapping of Lattice Surgery-based Quantum Circuits on Surface Code Architectures" May 28, 2018, arXiv: 1805.11127v1, pp. 1-15. (Year: 2018).*
McCaskey et al., "Extreme-Scale Programming Model for Quantum Acceleration within High Performance Computing" Oct. 4, 2017, arXiv: 1710.01794v1, pp. 1-20. (Year: 2017).*
Zahedinejad et Zaribafiyan, "Combinatorial Optimization on Gate Model Quantum Computers: A Survey" Aug. 16, 2017, arXiv: 1708.05294v1, pp. 1-19. (Year: 2017).*
1QBit.com [online], "Process—1QBit," available on or before Aug. 19, 2017 via Internet Archive: Wayback Machine URL<https://web.archive.org/web/20170819214434/http://1qbit.com/process/>, retrieved on Sep. 24, 2021, retrieved from URL<https://web.archive.org/web/20170819214434/http://1qbit.com/process/>, 1 page.
Aaronson et al., "Online Learning of Quantum States" Feb. 25, 2018, pp. 1-17. (Year: 2018).
Abbott et al., "A Hybrid Quantum-Classical Paradigm to Mitigate Embedding Costs in Quantum Annealing" Mar. 12, 2018, pp. i-29. (Year: 2018).
Accenture, "Think Beyond Ones and Zeros", Quantum Computing: From Theoretical to Tangible, Dec. 31, 2017, 20 pages.
Alom et al., "Quadratic Unconstrained Binary Optimization (QUBO) on Neuromorphic Computing System" May 14, 2017, pp. 3922-3929. (Year: 2017).
Apeldoorn et al., "Improvements in Quantum SDP-Solving with Applications" Apr. 13, 2018, pp. 1-36. (Year: 2018).
Arunachalam et al., "Quantum Query Algorithms are Completely Bounded Forms" Nov. 20, 2017, pp. 1-24. (Year: 2017).
Bian et al. "The Ising model: teaching an old problem new tricks," D-Wave systems, Aug. 30, 2010, 32 pages.
Biswas et al., "A NASA perspective on quantum computing: Opportunities and challenges" Nov. 27, 2016, pp. 81-98. (Year: 2016).
Biswas, Rupak "Quantum Machine Learning" Mar. 2018, pp. 1-30. (Year: 2018).
Brandao et al., "Quantum SDP Solvers: Large Speed-ups, Optimality, and Applications to Quantum Learning" Apr. 16, 2018, pp. 1-40. (Year: 2018).
Chapuis et al., "Finding Maximum Cliques on the D-Wave Quantum Annealer" Apr. 24, 2018, arXiv: 1801.08649v3, pp. 1-23. (Year: 2018).
Coles et al., "Quantum Algorithm Implementation for Beginners" Apr. 10, 2018, pp. 1-76. (Year: 2018).
Corcoles-Gonzalez et al., "Quantum Feature Kernel Estimation" Jun. 12, 2018, U.S. Appl. No. 62/684,149. (Year: 2018).
Corder et al., "Solving Vertex Cover via Ising Model on a Neuromorphic Processor" May 27, 2018. (Year: 2018).
Dallaire-Demers et al., "Quantum generative adversarial networks" Apr. 30, 2018, pp. 1-10. (Year: 2018).
Djidjev et al., "Efficient Combinatorial Optimization Using Quantum Annealing" Jan. 30, 2018, pp. 1-25. (Year: 2018).
Du et al., "Quantum Divide-and-Conquer Anchoring for Separable Non-negative Matrix Factorization" Feb. 20, 2018, pp. 1-17. (Year: 2018).
Dunning et al., "What Works Best When? A Framework for Systematic Heuristic Evaluation" May 4, 2015. (Year: 2015).
EP Office Action in European Appln. No. 19184540.3, dated Sep. 30, 2021, 11 pages.
EP Search Report in European Application No. EP19184540, dated Dec. 10, 2019, 11 pages.
Fu et al., "A Microarchitecture for a Superconducting Quantum Processor" May 11, 2018, pp. 40-47. (Year: 2018).
Fujii et Nakajima, "Harnessing Disordered-Ensemble Quantum Dynamics for Machine Learning" 2017, pp. 1-20. (Year: 2017).
Gondhi et al., "Survey on Machine Learning based scheduling in Cloud Computing", Intelligent Systems, Mar. 25, 2017, pp. 57-61.

(56) References Cited

OTHER PUBLICATIONS

Guerreschi et al., "Two-step approach to scheduling quantum circuits" Jul. 10, 2018, pp. 1-15. (Year: 2018).
Hadfield, Stuart Andrew "Quantum Algorithms for Scientific Computing and Approximate Optimization" May 8, 2018, pp. i-246. (Year: 2018).
Khanpour et al. "Probing Higgs boson couplings in Htγ production at the LHC," arXiv1702.05753v2, Sep. 20, 2017, 17 pages.
Killoran et al., "Continuous-variable quantum neural networks" Jun. 18, 2018, arXiv: 1806.06871v1, pp. 1-21. (Year: 2018).
Killoran et al., "Strawberry Fields: A Software Platform for Photonic Quantum Computing" Apr. 9, 2018, arXiv: 1804.03159v1, pp. 1-25. (Year: 2018).
Kumar et al., "Quantum Annealing for Combinatorial Clustering," CoRR, submitted on Jan. 26, 2018, arXiv:1708.05753v2, 18 pages.
LaRose, Ryan "Overview and Comparison of Gate Level Quantum Software Packages" Jul. 6, 2018, arXiv: 1807.02500v1, pp. 1-18. (Year: 2018).
Levit et al., "Reinforcement Learning via Replica Stacking of Quantum Measurements for the Training of Quantum Boltzmann Machines" Feb. 15, 2018, pp. 1-15. (Year: 2018).
Lewis et Glover, "Quadratic Unconstrained Binary Optimization Problem Preprocessing: Theory and Empirical Analysis" Sep. 2017, pp. 1-31. (Year: 2017).
McLean et al., "OpenFermion: The Electronic Structure Package for Quantum Computers" Jun. 21, 2018, pp. 1-22. (Year: 2018).
Neukart et al., "Traffic flow optimization using a quantum annealer" Aug. 9, 2017, arXiv: 1708.01625v2, pp. 1-12. (Year: 2017).
Otterbach et al., "Unsupervised Machine Learning on a Hybrid Quantum Computer" Dec. 15, 2017, arXiv: 1712.05771v1. (Year: 2017).
Paler et al., "NISQ circuit compilers: search space structure and heuristics" Jun. 19, 2018, arXiv: ,1806.07241v1, pp. 1-8. (Year: 2018).
Smith et al., "A Practical Quantum Instruction Set Architecture" Feb. 17, 2017. (Year: 2017).
Tang et al., "Fair Resource Allocation for Data-Intensive Computing in the Cloud" Feb. 2, 2018, pp. 20-33. (Year: 2018).
Tran et al., "A Hybrid Quantum-Classical Approach to Solving Scheduling Problems" 2016, pp. 98-106. (Year: 2016).
Ushijima-Mwesigwas et al., "Graph Partitioning using Quantum Annealing on the D-Wave System" Nov. 2017. (Year: 2017).
Ushijima-Mwesigwas et al. "Graph Partitioning using Quantum Annealing on the D-Wave System," Proceedings of the Second International Workshop on Post Moores Era Supercomputing, ACM, Nov. 2017, 20 pages.
Verdon et al., "A quantum algorithm to train neural networks using low-depth circuits" Dec. 14, 2017, pp. 1-8. (Year: 2017).
Verdon et al., "A Universal Training Algorithm for Quantum Deep Learning" Jun. 25, 2018, pp. 1-83. (Year: 2018).
Wang et al., The Quantum Approximation Optimization Algorithm for MaxCut: A Fernnionic View Jun. 9, 2017, arXiv: 1706.02998v1, pp. 1-13. (Year: 2017).
Wilson et al., "Quantum Kitchen Sinks: An algorithm for machine learning on near-term quantum computers" Jun. 21, 2018, arXiv: 1806.08321v1, pp. 1-8. (Year: 2018).
Zahedinejad et al., "Combinatorial Optimization on Gate Model Quantum Computers: A Survey", arXiv, Aug. 16, 2017, 19 pages.
Zhao et al., "Bayesian Deep Learning on a Quantum Computer" Jun. 29, 2018, pp. 1-13. (Year: 2018).
Zulehner et al., "An Efficient Methodology for Mapping Quantum Circuits to the IBM QX Architectures" Jun. 7, 2018, pp. 1-11. (Year: 2018).

\* cited by examiner

QUANTUM FORMULATION INDEPENDENT SOLVER

CROSS-REFERENCE TO RELATED APPLICATIONS

This application is a continuation (and claims the benefit of priority under 35 USC 120) of U.S. application Ser. No. 16/038,433, filed Jul. 18, 2018, and titled "QUANTUM FORMULATION INDEPENDENT SOLVER," which is incorporated by reference.

BACKGROUND

For some computational tasks, quantum computing devices may offer a computational speed up compared to classical devices. For example, quantum computing devices may achieve a speed up for tasks such as database search, evaluating NAND trees, integer factorization or the simulation of quantum many-body systems. Example quantum computing devices include adiabatic quantum annealers, quantum gate processors, and quantum simulators. Different quantum computing devices accept data inputs in different formats.

SUMMARY

This specification describes a quantum formulation solver that may be used to formulate data representing computational tasks that are to be performed by selected types of quantum computing resources.

In general, one innovative aspect of the subject matter described in this specification can be implemented in a computer implemented method comprising receiving, at a quantum formulation solver, data representing a computational task to be performed; deriving, by the quantum formulation solver, a formulation of the data representing the computational task that is formulated for a selected type of quantum computing resource; routing, by the quantum formulation solver, the formulation of the data representing the computational task to a quantum computing resource of the selected type to obtain data representing a solution to the computational task; generating, at the quantum formulation solver, output data including data representing a solution to the computational task; and receiving, at a broker, the output data and generating one or more actions to be taken based on the output data.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the formulation of the data representing the computational task comprises an Ising spin formulation, quadratic unconstrained binary optimization formulation, polynomial unconstrained binary optimization formulation, p-spin formulation, or a Pauli-Z quantum logic gate formulation.

In some implementations the computational task comprises an optimization task, simulation task, machine learning task, arithmetic task, database search task or data compression task.

In some implementations types of quantum computing resources comprise (i) quantum gate computers, (ii) quantum annealers, or (iii) quantum simulators.

In some implementations the data representing the computational task to be performed comprises data specifying a selected type of quantum computing resource for performing the computational task.

In some implementations the operations further comprise selecting, at the quantum formulation solver, an available quantum computing resource of the selected type, and wherein routing the formulation of the data representing the computational task to the quantum computing resource of the selected type comprises routing the formulation of the data representing the computational task to the selected available quantum computing resource of the selected type.

In some implementations selecting an available quantum computing resource of the selected type comprises: identifying one or more available quantum computing resources; determining properties of the one or more available quantum computing resources, wherein the properties comprise (i) computational times associated with solutions generated by the identified one or more available quantum computing resources, (ii) computational costs associated with solutions generated by the identified one or more available quantum computing resources, or (iii) approximate qualities of solutions generated by the identified one or more available quantum computing resources; and selecting an available quantum computing resource based on the determined properties.

In some implementations the data representing the computational task to be performed is independent of a formulation or particular quantum computing resource.

In some implementations deriving a formulation of the data representing the computational task that is formulated for a selected type of quantum computing resource comprises: obtaining, from a quantum device formulation requirements database, data indicating accepted formulation types for the selected type of quantum computing resource; obtaining, from a quantum algorithm and formulations database, data representing algorithm formulations of the accepted formulation types; and selecting, by a formulation selector, a formulation of the data representing the computational task based on the obtained data representing accepted formulation types and algorithm formulations.

In some implementations the data representing the computational task to be performed is formulated for a particular quantum computing resource, and wherein deriving a formulation of the data representing the computational task that is formulated for a selected type of quantum computing resource comprises: obtaining, from a quantum device formulation requirements database, data indicating accepted formulation types for the selected type of quantum computing resource; obtaining, from a quantum algorithm and formulations database, data representing algorithm formulations of the accepted formulation types; determining whether the formulation type of the data representing the computational task to be performed is included in the accepted formulation types or not; in response to determining that the formulation type of the data representing the computational task to be performed is not included in the accepted formulation types or not, selecting, by a formulation selector, a new formulation of the data representing the computational task based on the obtained data representing accepted formulation types and algorithm formulations.

In some implementations the method further comprises, in response to determining that the formulation type of the data representing the computational task to be performed is included in the accepted formulation types or not, adjusting the formulation of the data representing the computational task based on the obtained data representing accepted algorithm formulations.

In some implementations the method further comprises optimizing, by a formulation optimizer, the derived formulation of the data representing the computational task.

In some implementations generating output data including data representing a solution to the computational task comprises converting, by a solution conversion module, the data representing the solution to the computational task.

In some implementations the method further comprises receiving, at a machine learning module, the data representing a computational task to be performed; processing the received data using the machine learning model to determine which of one or more quantum computing resources to route the data representing the computational task to, wherein the machine learning model has been configured through training to route received data representing computational tasks to be performed in a system including at least two quantum computing resources; providing, to the quantum formulation solver, data representing the determined quantum computing resource and the data representing the computational task.

In some implementations deriving a formulation of the data representing the computational task that is formulated for a selected type of quantum computing resource comprises deriving a formulation of the data representing the computational task that is formulated for the determined quantum computing resource; and routing the formulation of the data representing the computational task to the a quantum computing resource of the selected type comprises routing the formulation of the data representing the computational task to the determined quantum computing resource.

In some implementations the received data is independent of a formulation or particular quantum computing resource.

In general, another innovative aspect of the subject matter described in this specification can be implemented in a computer implement method comprising receiving, at a quantum formulation solver, a formulation representing a computational task to be performed, wherein the formulation representing the computational task to be performed is formulated for a particular type of quantum computing resource; automatically determining that the particular type of quantum computing resource is not acceptable; automatically deriving, by the quantum formulation solver, a formulation of the data representing the computational task that is formulated for a different type of quantum computing resource; routing, by the quantum formulation solver, the formulation of the data representing the computational task to a quantum computing resource of the selected type to obtain data representing a solution to the computational task; generating, at the quantum formulation solver, output data including data representing a solution to the computational task; and generating one or more actions to be taken based on the output data.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations deriving a formulation comprises: obtaining, from a quantum device formulation requirements database, data indicating accepted formulation types for a selected type of quantum computing resource; obtaining, from a quantum algorithm and formulations database, data representing algorithm formulations of the accepted formulation types; determining whether the formulation type of the data representing the computational task to be performed is included in the accepted formulation types or not; in response to determining that the formulation type of the data representing the computational task to be performed is not included in the accepted formulation types or not, selecting, by a formulation selector, a new formulation of the data representing the computational task based on the obtained data representing accepted formulation types and algorithm formulations.

In some implementations the method further comprises, in response to determining that the formulation type of the data representing the computational task to be performed is included in the accepted formulation types or not, adjusting the formulation of the data representing the computational task based on the obtained data representing accepted algorithm formulations.

The subject matter described in this specification can be implemented in particular ways so as to realize one or more of the following advantages.

A quantum formulation independent solver, as described in this specification, can dynamically adjust formulations of data that is to be provided to different quantum computing resources. Such dynamic adjustments provides additional flexibility and enables quantum computing devices to be utilized more efficiently, since input data formulated for a specific type of quantum computing resource need not be queued until a quantum computing device of the specific type becomes available, but can be adjusted and immediately provided to an available quantum computing device for processing.

In addition, a quantum formulation solver, as described in this specification, can identify improved formulations of input data, sometimes overriding user specified input. Using improved formulations of input data ensures that better quantum computing resources are utilized and that better algorithms run on a selected quantum computing resource. As a result, systems described in this specification improve the quality and/or efficiency of the performance of computational tasks.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Different quantum computing devices accept data inputs in different formulations. Incorrectly formulated data inputs may not be accepted by a quantum computing resource, or may be accepted and processed but produce outputs that are not useful, wasting time and computational resources. Relatedly, an individual who is formulating a problem for processing by a quantum computing resource may only be proficient in formulating the problem for a particular type of quantum computing resource and that particular type of quantum computing resource many not be available.

This specification describes systems and methods for dynamically deriving and/or adjusting formulations of input data representing computational tasks to be performed by a specific type of quantum computing resource. A quantum formulation independent solver processes data representing a computational task to be solved and data specifying a specific type of quantum computing resource in order to automatically generate data that is formulated for the specified type of quantum computing resource. By taking into account various properties of received input data and the available quantum computing resources, the described system can more efficiently utilize different quantum computing resources, avoid bottlenecks, and obtain accurate solutions to different computational tasks.

Example Operating Environment

Figure 1:
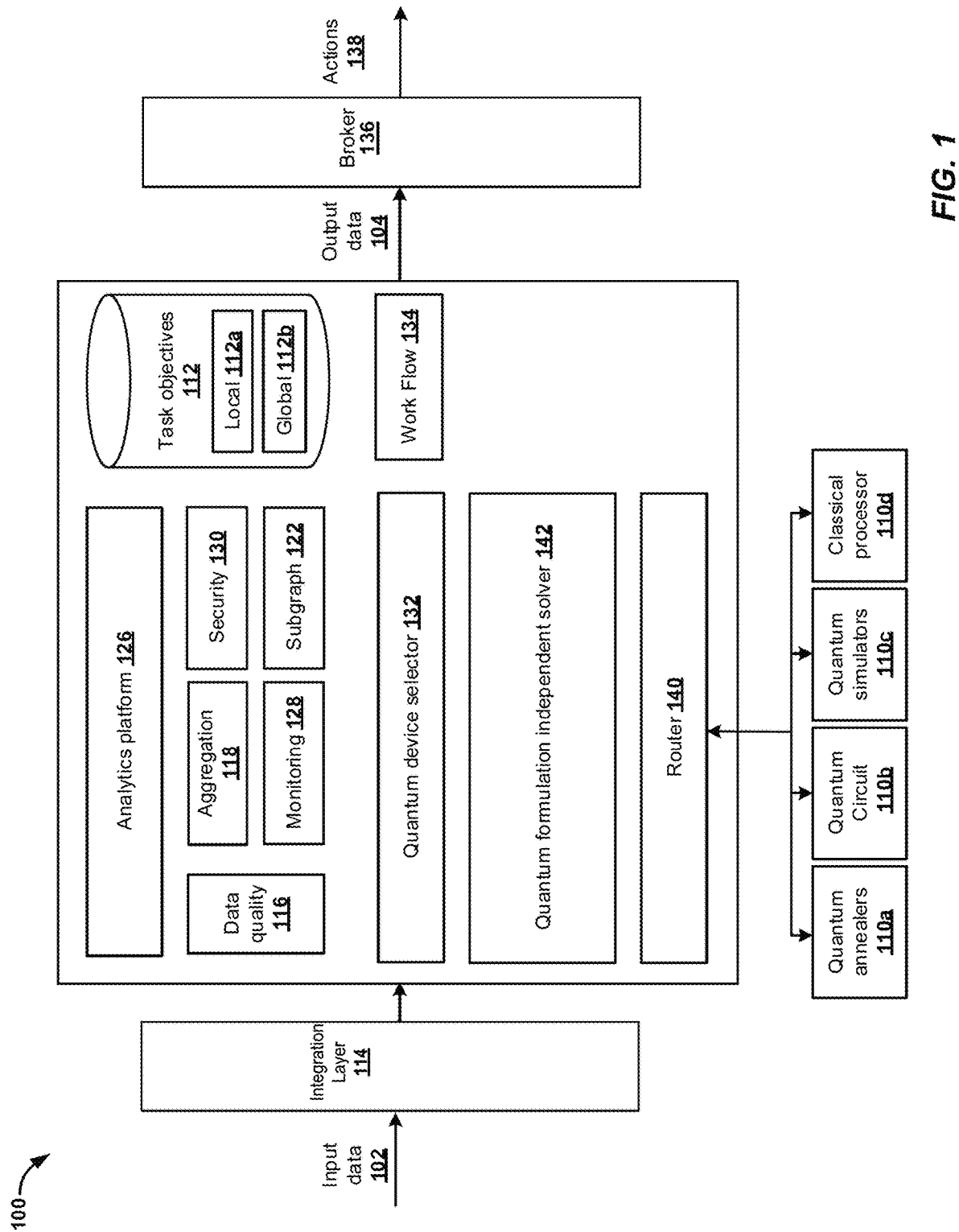
FIG. 1 depicts an example system for performing computational tasks.

FIG. 1 depicts an example system 100 for performing computational tasks. The system 100 is an example of a system implemented as computer programs on one or more computers in one or more locations, in which the systems, components, and techniques described below can be implemented.

The system 100 for performing computational tasks is configured to receive, as input, data representing a computational task to be solved, e.g., input data 102. The system 100 may be configured to solve multiple computational tasks, e.g., including optimization tasks, simulation tasks, arithmetic tasks, database search, machine learning tasks, or data compression tasks, and the input data 102 may include data that specifies one of the multiple computational tasks. For example, the input data 102 representing the computational task to be solved may specify one or more properties of the computational task. For example, in cases where the computational task is an optimization task, the input data 102 may include data representing parameters associated with the optimization task, e.g., parameters over which an objective function representing the optimization task is to be optimized, and one or more values of the parameters. As another example, in cases where the computational task is a simulation task, the input data 102 may include data representing an energy function and values of parameters that specify an initial state of a system, e.g., a material or chemical, to be simulated.

In some implementations the input data 102 may be independent of a formulation or particular quantum computing resource. For example, the input data 102 may represent a computational task and specify a classical function of multiple parameters that is to be minimized (or maximized), or may represent a simulation task and take the form of an energy function and values of parameters that specify an initial state of a system to be simulated. In these examples, to solve the computational tasks using a particular quantum computing resource, the input data 102 may need to be formulated. For example, in some cases a quantum annealer may take data inputs that have a quadratic unconstrained binary optimization (QUBO) formulation, whereas a quantum gate processor may take inputs that have an Ising spin formulation. An example Ising spin formulation of an optimization task to be solved using a maxcut algorithm is given by $$\text{minimize} \sum_{i \leq j}^{N} -w * (1 - s_i s_j), \text{ where } s_i \in \{-1, 1\}$$

where w represents a vector of task parameters and $s_i$ represents spin variables. An example QUBO formulation of the same optimization task is given by $$\text{minimize} \sum_{i \leq j}^{N} -w * (x_i - x_j)^2, \text{ where } x_i \in \{0, 1\}$$

where $x_i$ represents binary variables. Other example formulations include Pauli operator formulations, e.g., that are suitable for providing to quantum gate processors.

In other implementations the input data 102 may already be formulated.

In some cases the input data 102 may include static input data and dynamic input data, e.g., real-time input data. As an example, the input data 102 may be data that represents the task of optimizing the design of a water network in order to optimize the amount of water distributed by the network. In this example, the input data 102 may include static input data representing one or more properties of the water network, e.g., a total number of available water pipes, a total number of available connecting nodes or a total number of available water tanks. In addition, the input data 102 may include data representing one or more parameters associated with the optimization task, e.g., level of water pressure in each pipe, level of water pressure at each connecting node, height of water level in each water tank, concentration of chemicals in the water throughout the network, water age or water source. Furthermore, the input data 102 may include dynamic input data representing one or more current properties or values of parameters of the water network, e.g., a current number of water pipes in use, a current level of water pressure in each pipe, a current concentration of chemicals in the water, or a current temperature of the water.

In some implementations, the input data 102 may further include data specifying one or more task objectives associated with the computational task. The task objectives may include local task objectives and global task objectives. Local task objectives may include local targets to be considered when solving the computational task, e.g., local objectives of a solution to the computational task. For example, local objectives may include constraints on values of subsets of computational task variables. Global task objectives may include global targets to be considered when solving the computational task, e.g., global objectives of a solution to the computational task.

For example, continuing the above example of the task of optimizing a water network, the input data 102 may further include data specifying local task objectives such as a constraint on the concentration of chemicals in the water, e.g., constraining the chemical concentration to between 0.2% and 0.5%, and on the number of water pipes in use, e.g., constraining the total number of water pipes to less than 1000. Another example local task objective may be to optimize a particular portion of the water network. In addition, the input data 102 may further include data specifying global task objectives such as one or more global targets, e.g., a target of keeping water wastage to below 2% or a target of distributing at least 10 million gallons of water per day.

In other implementations, data specifying one or more task objectives associated with the computational task may be stored in the system 100 for performing computational tasks, e.g., in task objective data store 112. For example, as described above, the system 100 for performing computational tasks may be configured to solve multiple computational tasks and the input data 102 may be data that specifies one of the multiple computational tasks. In this example, the system 100 for performing computational tasks may be configured to store task objectives corresponding to each computational task that it is configured to perform. For convenience, data specifying one or more task objectives associated with the computational task is described as being stored in task objective data store 112 throughout the remainder of this document.

In some implementations the input data 102 may further include data specifying a type of computing device that should be used to perform the computational task. Example types of computing devices include different classical processors, e.g., workstations or supercomputers, and different quantum computing devices, e.g., quantum annealers, quantum simulators, or quantum circuits/quantum gate processors. Different types of classical processors and quantum computing devices are described in more detail below.

For example, in some cases the input data 102 may include data representing an optimization task to be solved, and may also include data specifying that a quantum annealing computing resource should be used to perform the optimization task. As another example, in some cases the input data may include data representing a simulation task to be performed, and may also include data specifying that a quantum simulator should be used to perform the simulation task. As another example, in some cases the input data may include data representing an arithmetic task or database search, and may also include data specifying that a quantum circuit should be used to perform the arithmetic task or database search.

Data specifying a type of computing device can be provided by a user of the system 100. For example, in some cases a user may have prior knowledge that a certain type of computing device is more suited to a particular computing device, and may therefore specify that the computational task be performed by the particular computing device. In other cases a user may wish to test a computing device's capabilities at solving a particular task and may therefore specify that the computational task be performed by the computing device. As another example, in some cases a user may specify a type of computing device due to cost or time constraints, e.g., choosing a computing device that is cheaper to run or that processes data at a faster rate. As yet another example, the system may automatically determine a quantum computing device to use for a specified computational task based at least in part on cost, availability, and/or performance of the quantum computing device.

The system 100 for performing computational tasks is configured to process the received input data 102 to generate output data 104 and to take actions 138 based at least in part on the output data 104. The generated output data 104 may include data representing a solution to the computational task specified by the input data 102. For example, continuing the above example of the task of globally optimizing a water network with respect to task objectives such as wastage targets and distribution targets, the output data 104 may include data representing an optimal configuration of the above described parameters associated with the water network optimization task. Alternatively or in addition, the output data 104 may include data representing multiple local solutions to the water network optimization task, e.g., data specifying an optimal number of water pipes to use, an associated water pressure in each pipe, or a concentration of chemicals in the water flowing through the network.

A broker 136 can use the output data 104 to initiate one or more actions associated with the computational task specified by the input data 102, e.g., actions 138. For example, continuing the above example of the task of optimizing a water network, the output data 104 may be used to adjust one or more parameters in the water network, e.g., increase or decrease a current water chemical concentration, increase or decrease a number of water pipes in use, or increase or decrease one or more water pipe pressures.

To process the received input data 102, the system 100 includes a quantum device selector 132 that selects specific quantum computing resources for performing different computational tasks. For example, in cases where received input data 102 specifies a type of quantum computing resource that should be used to perform a computational task, the quantum device selector 132 may be configured to identify one or more available quantum computing resources of the specified type. The quantum device selector 132 may then determine properties of the available quantum computing resources and used the determined properties to select a quantum computing resource. Example properties are described in more detail below with reference to FIG. 3. The input data and data specifying the selected quantum computing resource of the selected type may then be provided to the quantum formulation independent solver 142.

In cases where the received input data 102 does not specify a selected type of quantum computing resource that should be used to perform the computational task, the quantum device selector 132 may further determine a selected type of quantum computing resource and then select an available quantum computing resource of the determined type. For example, in some implementations the quantum device selector 132 may include a machine learning module that is configured to learn which computational tasks to route to different computing resources, e.g., computing resources 110a-110d. For example, the machine learning module may include a machine learning model that may be trained using training data to determine when and where to outsource certain computations. The training data may include labeled training examples, e.g., a machine learning model input paired with a respective known machine learning model output, where each training example includes data from multiple resources, as described in more detail below. The machine learning model may process each machine learning model input to generate a respective machine learning model output, compute a loss function between the generated machine learning model output and the known machine learning model, and back-propagate gradients to adjust machine learning model parameters from initial values to trained values. The machine learning model can be utilized by the system when the input data 102 does not specify a specific type of computing resource that should be used to perform the computational task. There are yet other cases where the input data includes a computational task that is formulated for a specific type of quantum computing device but the specified type of quantum computing device is not available or a different type of quantum computing device is preferable based on one or more factors such as cost or performance.

The quantum formulation independent solver 142 receives input data 102 and data specifying the quantum computing resource of the selected type. The quantum formulation independent solver 142 is configured to derive a formulation of the input data 102 that is suitable for the specified quantum computing resource. For example, the quantum formulation independent solver 142 may derive an Ising formulation of the input data 102 if the specified quantum computing resource is a quantum annealer or a quantum gate processor. As another example, the quantum formulation independent solver 142 may derive a QUBO formulation if the specified quantum computing resource is a quantum annealer. As another example, the quantum formulation independent solver 142 may derive a formulation based on quantum logic gates, e.g., single-qubit gates and CNOT gates, if the specified quantum computing resource is a quantum gate processor. Deriving formulations of input data is described in more detail below with reference to FIGS. 2 and 3.

Formulated data inputs are provided to the specific quantum computing resource, e.g., at least one of the computing resources 110a-110d, for processing via a router 140. In some implementations the computing resources 110a-110d may be external to the system 100. For example, as illustrated in FIG. 1, the system 100 may be configured to analyze received input data 102 representing a computational task to be solved and outsource one or more computations associated with solving the computational task to at least one of the additional computing resources 110a-110d. In other implementations the computing resources 110a-110d may be included in the system 100.

The computing resources 110a-110d may include quantum annealer computing resources, e.g., quantum annealer 110a. A quantum annealer is a device configured to perform quantum annealing—a procedure for finding the global minimum of a given objective function over a given set of candidate states using quantum tunneling. Quantum tunneling is a quantum mechanical phenomenon where a quantum mechanical system overcomes localized barriers in the energy landscape which cannot be overcome by classically described systems.

The computing resources 110a-110d may include one or more quantum gate processors, e.g., quantum gate processor 110b. A quantum gate processor includes one or more quantum circuits, i.e., models for quantum computation in which a computation is performed using a sequence of quantum logic gates, operating on a number of qubits (quantum bits).

The computing resources 110a-110d may include one or more quantum simulators, e.g., quantum simulator 110c. A quantum simulator is a quantum computer that may be programmed to simulate other quantum systems and their properties. Example quantum simulators include experimental platforms such as systems of ultra-cold quantum gases, trapped ions, photonic systems or superconducting circuits.

The computing resources 110a-110d may include one or more classical processors, e.g., classical processor 110d. In some implementations, the one or more classical processors, e.g., classical processor 110d, may include supercomputers, i.e., computers with high levels of computational capacity. For example, the classical processor 110d may represent a computational system with a large number of processors, e.g., a distributed computing system or a computer cluster.

Optionally, the system 100 for performing computational tasks may include an integration layer 114 and a broker 136. The integration layer 114 may be configured to manage received input data, e.g., input data 102. For example, the integration layer 114 may manage data transport connectivity, manage data access authorization, or monitor data feeds coming into the system 100.

The broker 136 may be configured to receive output data 104 from the system 100 for performing optimization tasks and to generate one or more actions to be taken, e.g., actions 138. The actions may include local actions, e.g., adjustments to a subset of optimization parameters, which contribute towards achieving targets of the optimization task.

Optionally, the system 100 for performing computational tasks may include a monitoring module 128. The monitoring module 128 is configured to monitor interactions between and transactions to and from the one or more additional computing resources 110a-d. For example, the monitoring module 128 may be configured to detect failed or stuck calls to one or more of the additional computing resources 110a-d. Example failures that can cause a call to one or more of the additional computing resources 110a-d to fail or get stuck include issues with a transport layer included in the system 100, i.e., issues with data being moved through the cloud, security login failures, or issues with the additional computing resources 110a-d themselves such as performance or availability of the additional computing resources 110a-d. The monitoring module 128 may be configured to process detected failed or stuck calls to one or more of the additional computing resources 110a-d and determine one or more corrective actions to be taken by the system 100 in response to the failed or stuck calls. Alternatively, the monitoring module 128 may be configured to notify other components of the system 100, e.g., the quantum device selector 132 or quantum formulation independent solver 142, of detected failed or stuck calls to one or more of the computing resources 110a-d.

For example, if one or more computations are outsourced to a particular quantum computing resource, however the particular quantum computing resource suddenly becomes unavailable or is processing outsourced computations too slowly, the monitoring module 128 may be configured to notify relevant components of the system 100, e.g., the quantum device selector 132. The quantum device selector 132 may then be configured to determine one or more corrective actions, e.g., instructing the system 100 to outsource the computation to a different computing resource or to retry the computation using the same computing resource. Generally, the suggested corrective actions may include actions that keep the system 100 successfully operating in real time, e.g., even when resource degradations outside of the system 100 are occurring.

Optionally, the system 100 for performing computational tasks may include a security component 130. The security component 130 is configured to perform operations relating to the security of the system 100. Example operations include, but are not limited to, preventing system intrusions, detecting system intrusions, providing authentication to external systems, encrypting data received by and output by the system 100, and preventing and/or remedying denial of service (DoS).

Optionally, the system 100 for performing computational tasks may include a subgraph module 122. The subgraph module 122 may be configured to partition a computational task into multiple sub tasks. For example, the subgraph module 122 may be configured to analyze data specifying a computational task to be solved, and to map the computational task to multiple minimally connected subgraphs. The minimally connected subgraphs may be provided to a computation engine for processing, e.g., to be routed to the additional computing resources 110a-110d via the quantum device selector 132.

Optionally, the system 100 for performing computational tasks may include a data quality module 116. The data quality module 116 is configured to receive the input data 102 and to analyze the input data 102 to determine a quality of the input data 102. For example, the data quality module 116 may score the received input data 102 with respect to one or more data quality measures, e.g., completeness, uniqueness, timeliness, validity, accuracy or consistency. For example, in some implementations the system 100 may be configured to receive a data feed from an internet of things (IoT) sensor, e.g., that tracks the position of an object or entity within an environment. If the data quality module 116 determines that one of these objects or entities has moved an unrealistic distance in a particular period of time, the data quality module 116 may determine that the quality of the received data feed is questionable and that the data feed may need to be further analyzed or suspended.

Each measure may be associated with a respective predetermined score threshold that may be used to determine whether data is of acceptable quality or not. For example, the data quality module 116 may determine that the input data 102 is of an acceptable quality if the scored input data 102 exceeds a majority of the predetermined score thresholds.

If it is determined that the input data 102 is of an acceptable quality, the data quality module 116 may be configured to provide the input data 102 to an aggregation module 118. The aggregation module 118 is configured to receive repeated data inputs, e.g., including input data 102, and to combine the data inputs. The aggregation module 118 may be configured to provide combined data inputs to other components of the system 100. For example, in some implementations the system 100 may include an IoT sensor that receives input data readings every 500 ms. Typically, the system 100 or an optimization task corresponding to the input data readings may only require that input data readings be received every 5 seconds. Therefore, in this example, the aggregation module 118 may be configured to combine and aggregate the input readings in order to generate a simpler data input. In some cases this may improve the efficiency of downstream calculations performed by the system 100.

If it is determined that the input data 102 is not of an acceptable quality the data quality module 116 may be configured to instruct the system 100 to process an alternative data input, e.g., a data input that is an average from previous data inputs or extrapolated from the current data stream. Alternatively, if the accuracy of a particular data input is determined to be critical to the system's ability to perform one or more computations, the data quality module 116 may be configured to enter an error condition. In these examples, the data quality module 116 may learn when and how to instruct the system 100 to process alternative data inputs through a machine learning training process.

Optionally, the system 100 may include an analytics platform 126. The analytics platform 126 is configured to process received data, e.g., input data 102 or data representing solutions to a computational task, and provide analytics and actionable insights relating to the received data.

Optionally, the system 100 may include a workflow module 134. The workflow module 134 may be configured to provide a user interface for assigning values to computational task parameters, defining computational task objectives, and managing the learning process by which the quantum device selector 132 may be trained. The workflow module 134 may be further configured to allow for users of the system 100 to coordinate on complex objective-related tasks such that the system 100 may be used efficiently. The workflow module 134 may also be configured to allow for various levels of role-based access controls. For example, the workflow module 134 may be configured to allow a junior team member to modify some of the task objectives, but keeps them from modifying critical ones. In this manner, the workflow module 134 may reduce the likelihood that critical undesirable actions, such as the opening of large water mains in a water network, are avoided.

Figure 2:
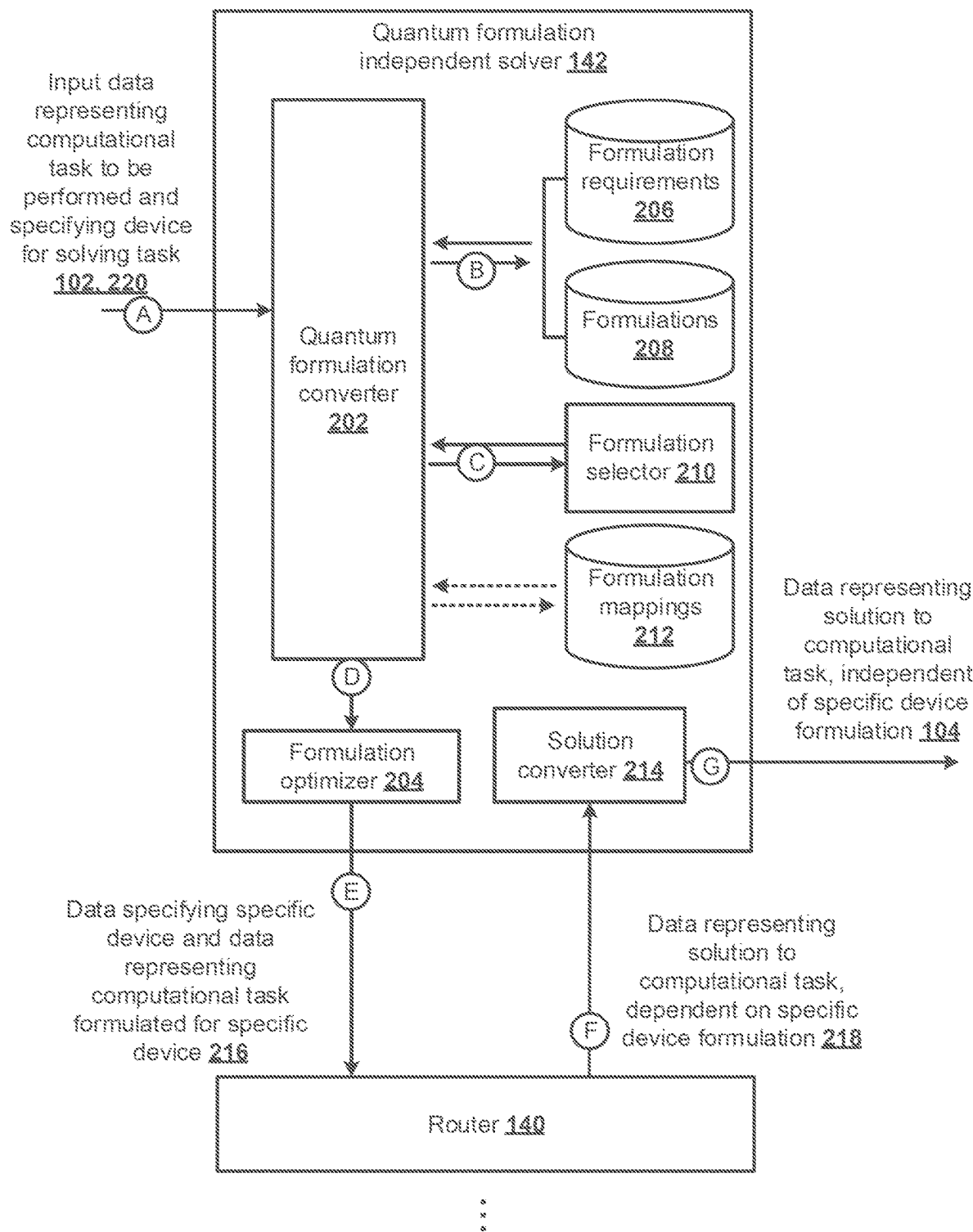
FIG. 2 depicts an example quantum formulation independent solver.

FIG. 2 depicts an example quantum formulation independent solver 142, as introduced above with reference to FIG. 1. The example quantum formulation independent solver 142 includes a quantum formulation converter 202, a formulation optimizer 204, a formulation requirements database 206, a formulations database 208, a formulation selector 210, a formulation mappings database 212, and a solution converter 214. As described above with reference to FIG. 1, the quantum formulation independent solver 142 is in communication with at least one or more quantum computing resources via the router 140.

During operation (A), the quantum formulation independent solver 142 receives as input data representing a computational task to be performed, e.g., input data 102 described with reference to FIG. 1, and data specifying a device type to be used when performing the computational task 220, e.g., received from the quantum device selector 132 described with reference to FIG. 1. The received data 102, 220 is provided to the quantum formulation converter 202.

The quantum formulation converter 202 is configured to formulate data representing the computational task for the selected type of quantum computing device that is to perform the computational task. Different quantum computing devices accept data inputs in different formulations. For example, the formulations accepted by different quantum computing devices may depend on the underlying architecture of the quantum computing device, e.g., whether the device operates on a linear array of qubits or a two-dimensional grid of qubits. As another example, the formulations accepted by different quantum computing devices may depend on the type of quantum computing device, e.g. a quantum gate model computer may accept different formulations of data, e.g., data representing different sequences of quantum logic gates, than an adiabatic quantum computer, e.g., that accepts data representing Hamiltonians and evolution instructions. As another example, the formulations accepted by different quantum computing devices may depend on how qubits in the quantum computing devices are realized, e.g., qubits that are realized by electrons may only accept data inputs that are formulated in terms of Ising spin variables. Incorrectly formulated data inputs may not be accepted by a quantum computing resource, or may be accepted and processed but produce meaningless outputs, wasting time and computational resources.

In some implementations the received data 102 may be independent of a particular formulation or quantum computing resource. In these implementations the quantum formulation converter 202 generates a formulation based on the data specifying the type of quantum computing resource 220. In other implementations the received data 102 may already be formulated for a particular type of quantum computing resource, but this particular type may be different to the type of quantum computing resource specified by the received data 220. In these implementations the quantum formulation converter 202 may generate a new formulation for the input data 102. In other implementations the implementations the received data 102 may already be formulated for a particular type of quantum computing resource that matches the type of quantum computing resource specified by the received data 220. In these implementations the quantum formulation converter may provide the data 220 directly to the formulation optimizer 204 for optimization.

During operation (B), to formulate the data representing the computational task for the selected type of quantum computing device that is to perform the computational task, the quantum formulation converter 202 queries a formulation requirements database 206 that stores data representing accepted formulation types for different types of quantum computing resources to obtain data indicating accepted formulation types for the selected type of quantum computing device that is to perform the computational task.

In some implementations the formulation requirements database 206 may further store information detailing the efficiency of a formulation for different types of quantum computing resources or specific quantum computing devices as well as data indicating whether a formulation is accepted by the types of quantum computing resources. For example, different quantum gate computers may natively support different sets of quantum logic gates and derive other quantum logic gates that are not included in the native set of quantum logic gates, e.g., some quantum gate computers may only support single and two qubit gates and therefore not natively support formulations based on three qubit gates such as Toffoli gates. Derived quantum logic gates often are less efficient than the native gates. Such information can be used by the formulation selector 210 when selecting a formulation of the input data 102.

The quantum formulation converter 202 also queries a quantum algorithm and formulations database 208 that stores data representing different algorithms that may be performed to solve particular computational tasks using different types of formulated input data to obtain data representing algorithm formulations of the accepted formulation types. For example, the quantum algorithm and formulations database 208 may store corresponding formulation types, functions or modules as tuples, e.g., a function generating an Ising Spin formulation of MAXCUT may be stored as the tuple (Ising Spin, MAXCUT, function), and a function generating a QUBO formulation of MAXCUT may be stored as the tuple (QUBO, MAXCUT, function). In these examples, if a new MAXCUT formulation were required, e.g., a Pauli gate representation, a function generating the Pauli gate formulation for MAXCUT would be determined through application of formulation conversion rules and stored as the tuple (Pauli, MAXCUT, function) for future use.

During operation (C), the quantum formulation converter 202 provides the received input data 102, data obtained from the formulation requirements database 206 and data obtained from the quantum algorithm and formulations database 208 to the formulation selector 210. The formulation selector 210 processes the received data and selects a formulation of the input data 102.

Optionally, the quantum formulation converter 202 may request a mapping of a received formulation of input data or of a selected formulation of input data 102 from the formulation mapping database 212. The formulation mapping database 212 stores information, e.g., known mappings, that may be used to map one formulation to another formulation. For example, if received input data or a selected formulation of input data is formulated in terms of spin variables but a formulation in terms of a QUBO is required, the quantum formulation converter 202 may access the formulation mapping database 212 to identify a mapping or transformation that can be applied to map the formulation from spin variables to QUBO variables. In some implementations the formulation mapping database 212 may further store data representing accuracy or efficiency gains or losses associated with formulation transformations. Such data may be used by the quantum formulation converter to determine whether to reformulate a formulation. For example, if a transformation of a formulation incurs a significant loss of accuracy, the quantum formulation converter 202 may not reformulate the formulation. Determining whether to reformulate a formulation may also depend on other factors, such as quantum computing resource availability and cost, as described above.

During operation (D), the quantum formulation converter 202 provides data representing the formulation of the input data 102 selected by the formulation selector 210 to the formulation optimizer 204. The formulation optimizer 204 is configured to optimize the formulation of the input data 102. For example, the formulation optimizer 204 may simplify the formulation, e.g., by removing any redundant terms or expanding and cancelling certain terms. In some cases the formulation optimizer 204 may simplify the formulation based on the data obtained from the quantum algorithm and formulations database 208, e.g., to optimize the formulation for the quantum algorithm that will be used to perform the computational task.

During operation (E), the optimizer formulated input data is provided to the router 140. The router 140 routes the optimized formulated input data to a quantum computing resource of the selected type.

During operation (F), the quantum formulation independent solver 142 receives data representing a solution to the computational task specified by the input data 102, e.g., data 218. The received data 218 may be dependent on the specific device that the formulated input data was routed to. For example, in the example of MAXCUT, results returned from the quantum computing device may include a collection of bit strings and the number of observed occurrences per bit string, e.g. 1010: 5, 0101: 5, 1000: 2. A user, however, may expect the result of MAXCUT to provide the sets of left and right nodes. In this case, given the problem of partitioning [a b c d], the solution converter module 214 may process the data received from the quantum computing device and return [a c] and [b d] instead of 1010. As another example, the solution converter module 214 may incorporate device-specific return info. For example, the quantum computing device may return the temperature of the quantum computer which could be used as an approximate estimate of solution reliability/accuracy. Since a user may not know how to interpret a temperature value, the solution converter 214 may be configured to estimate an accuracy metric derived from the temperature metric to return to the user.

During operation (G), the quantum formulation independent solver 142 provides as output data representing a solution to the computational task specified by the input data 102 in a format that is independent of the specific quantum computing resource that performed the computational task.

Programming the Hardware

Figure 3:
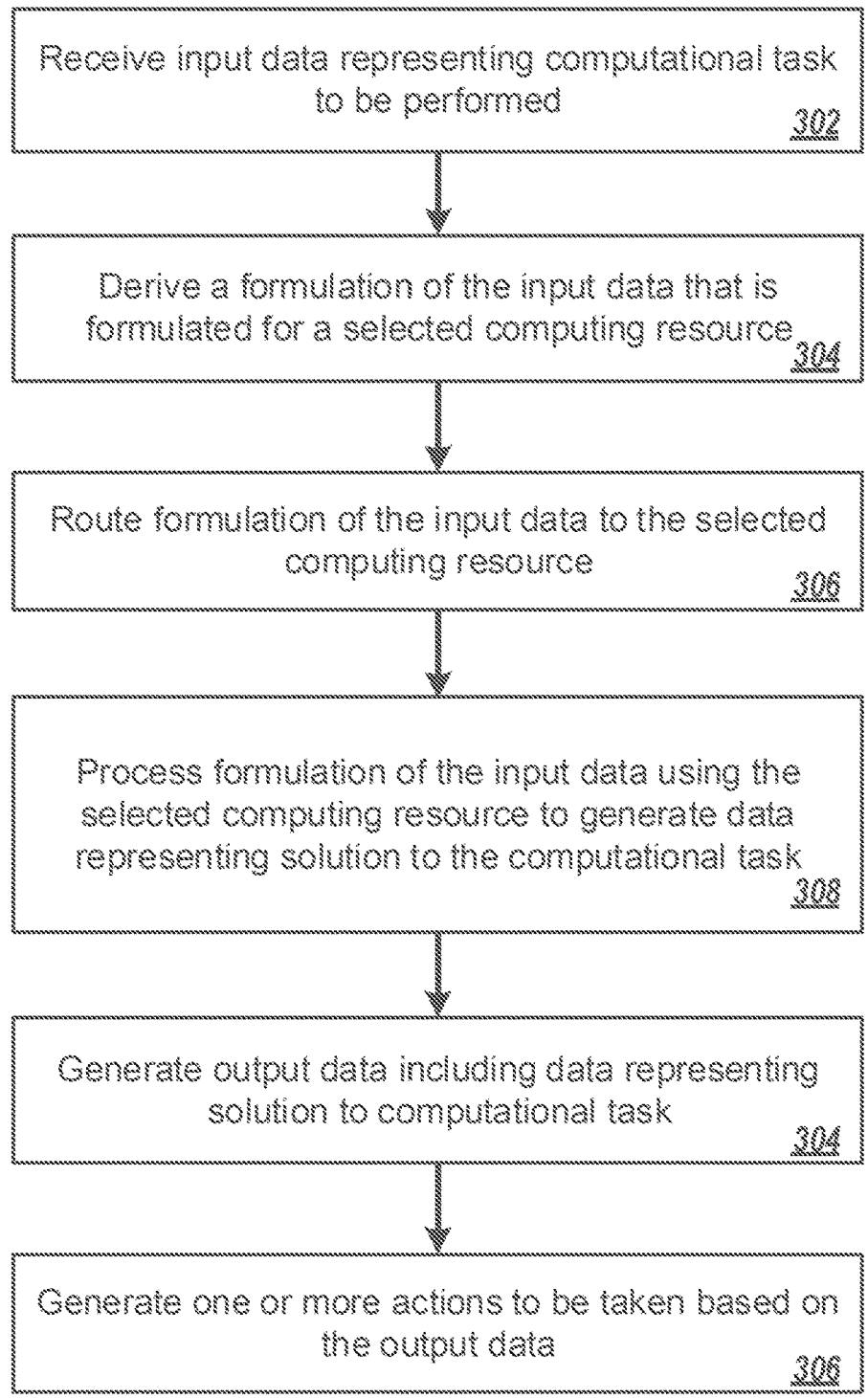
FIG. 3 is a flow diagram of an example process for obtaining a solution to a computational task using a system including one or more quantum computing resources.

FIG. 3 is a flow diagram of an example process 300 for obtaining a solution to a computational task using a system including one or more quantum computing resources. For convenience, the process 300 will be described as being performed by a system of one or more computers located in one or more locations. For example, a system for performing computational tasks, e.g., the system 100 of FIG. 1, appropriately programmed in accordance with this specification, can perform the process 300.

The system receives data representing a computational task to be performed (step 302). The computational task is a task that may be performed by a system including one or more quantum computing resources, e.g., one or more quantum gate computers, adiabatic annealers, or quantum simulators, or one or more classical computing resources, e.g., one or more classical computers or super computers. For example, the computational task may be an optimization task, simulation task, machine learning task, arithmetic task, database search task or data compression task.

In some implementations the data representing a computational task to be performed may be independent of a formulation or a particular quantum computing resource. For example, the data may represent an optimization task and take the form of a classical function of multiple parameters that is to be minimized (or maximized), or may represent a simulation task and take the form of an energy function and values of parameters that specify an initial state of a system to be simulated.

Alternatively, the data representing a computational task to be performed may already be formulated for a particular quantum computing resource, e.g., may already be represented as an Ising spin, quadratic unconstrained binary optimization, or a quantum logic gate formulation such as a Pauli gate formulation or Toffoli gate formulation.

If necessary, the system derives a formulation of the data representing the computational task to be performed that is formulated for a selected type of quantum computing resource (step 304).

In some implementations the selected type of quantum computing resource may be specified by the data received by the system at step 302. For example, at step 302 the system may further receive data specifying a selected type of quantum computing resource for performing the computational task. In these examples, the received data may include data representing an optimization task to be performed and data specifying that the optimization task should be performed by a quantum annealer. In these cases the received data representing the computational task to be performed may already be formulated for the specified type of quantum computing resource, or may be independent of any formulation or type of quantum computing resource.

In other implementations the system may identify and select a type of quantum computing resource based on the received data representing the computational task to be solved. For example, the system may include a machine learning model that has been configured through training to determine which type of quantum computing resource to utilize.

To derive a formulation of the data representing the computational task to be performed that is formulated for the selected type of quantum computing resource, the system obtains data indicating accepted formulation types for the selected type of quantum computing resource, e.g., from a quantum device formulation requirements database. For example, in cases where the system receives data representing an computational task to be performed, and the selected type of quantum computing resource is a quantum gate computer, the system may obtain data indicating that a quantum gate computer accepts computational tasks that are formulated using a particular set of quantum logic gates.

The system then obtains data representing algorithm formulations of the accepted formulation types, e.g., from a quantum algorithm and formulations database. Continuing the example above, in cases where the system receives data representing a computational task to be performed and the selected quantum computing resource is a quantum gate computer that accepts quantum logic gate formulations, the system may obtain data indicating one or more algorithms, e.g., sequences of quantum logic gates that can be implemented by a quantum gate computer, that when executed solve the computational task.

The system then selects a formulation of the data representing the computational task based on the obtained data representing accepted formulation types and algorithm formulations.

Optionally, the system may optimize the selected formulation. For example the system may simplify the selected formulation, e.g., by removing any redundant terms or expanding and cancelling certain terms, or perform other adjustments to improve the formulation for the quantum algorithm that will be used to perform the computational task.

The system routes the formulation of the data representing the computational task to a quantum computing resource of the selected type to obtain, from the quantum computing resource, data representing a solution to the computational task (step 306). For example, the system may select an available quantum computing resource of the selected type from multiple available quantum computing resources and route the formulation of the data representing the computational task to the selected available quantum computing resource of the selected type.

To select an available quantum computing resource of the selected type from multiple available quantum computing resources, the system may first identify the multiple available quantum computing resources. An available quantum computing resource may be a resource that is not running another computational task or that is expected to finish running another computational task within a predetermined time period. The system may then determine properties of the identified available quantum computing resources and use the determined properties to select one of the available quantum computing resources.

For example, the system may determine computational times associated with solutions generated by the identified one or more available quantum computing resources. In this example, available quantum computing resources that generate solutions to the same or similar computational tasks in less time may be favored over other quantum computing resources.

Alternatively or in addition, the system may determine computational costs associated with solutions generated by the identified one or more available quantum computing resources. In this example, available quantum computing resources that generate solutions to the same or similar computational tasks at a lower cost may be favored over other quantum computing resources.

Alternatively or in addition, the system may determine approximate qualities of solutions generated by the identified one or more available quantum computing resources. In this example, available quantum computing resources that generate solutions to the same or similar computational tasks at higher accuracy may be favored over other quantum computing resources.

The obtained data representing a solution to the computational task includes data representing results of computations performed by the quantum computing resource of the selected type. For example, the obtained data may include measurement results of observables representing a solution to the computational task.

The system generates output data including data representing a solution to the computational task (step 308). For example, the system may convert measurement results representing a solution to the computational task to a different, more understandable format. For example, in cases where the computational task is a simulation task, e.g., the task of simulating properties of a material such as the conductivity of a semiconductor or the task of simulating properties of a chemical compound, the system may generate output data by converting measurement results.

The system generates one or more actions to be taken based on the output data (step 310). The type of actions generated by the system are dependent on the computational task represented by the data received by the system at step 302.

For example, continuing the example above, in cases where the computational task is the task of designing of a water network in order to optimize the amount of water distributed by the network, the generated one or more actions may include adjusting water network parameters based on the output data, e.g., adjusting the number of water pipes to use in the network, adjusting an associated water pressure in each pipe, or a concentration of chemicals in the water flowing through the network.

As another example, in cases where the computational task is the task of optimizing traffic flow in a city or other area the generated one or more actions may include dynamic updates to speed limits at various locations in the city or updates to recommended routes through the city.

As another example, in cases where the computational task is the task of simulating properties of a material, the generated one or more actions may include modifications of the material, e.g., a semiconductor, or modifications of the design of a device that includes the material, e.g., a semiconductor device such as a Josephson junction.

As another example, in cases where the computational task is the task of simulating properties of a chemical for drug discovery, the generated one or more actions may include modifications to the chemical itself or to the design of a drug that will include the chemical.

Figure 4:
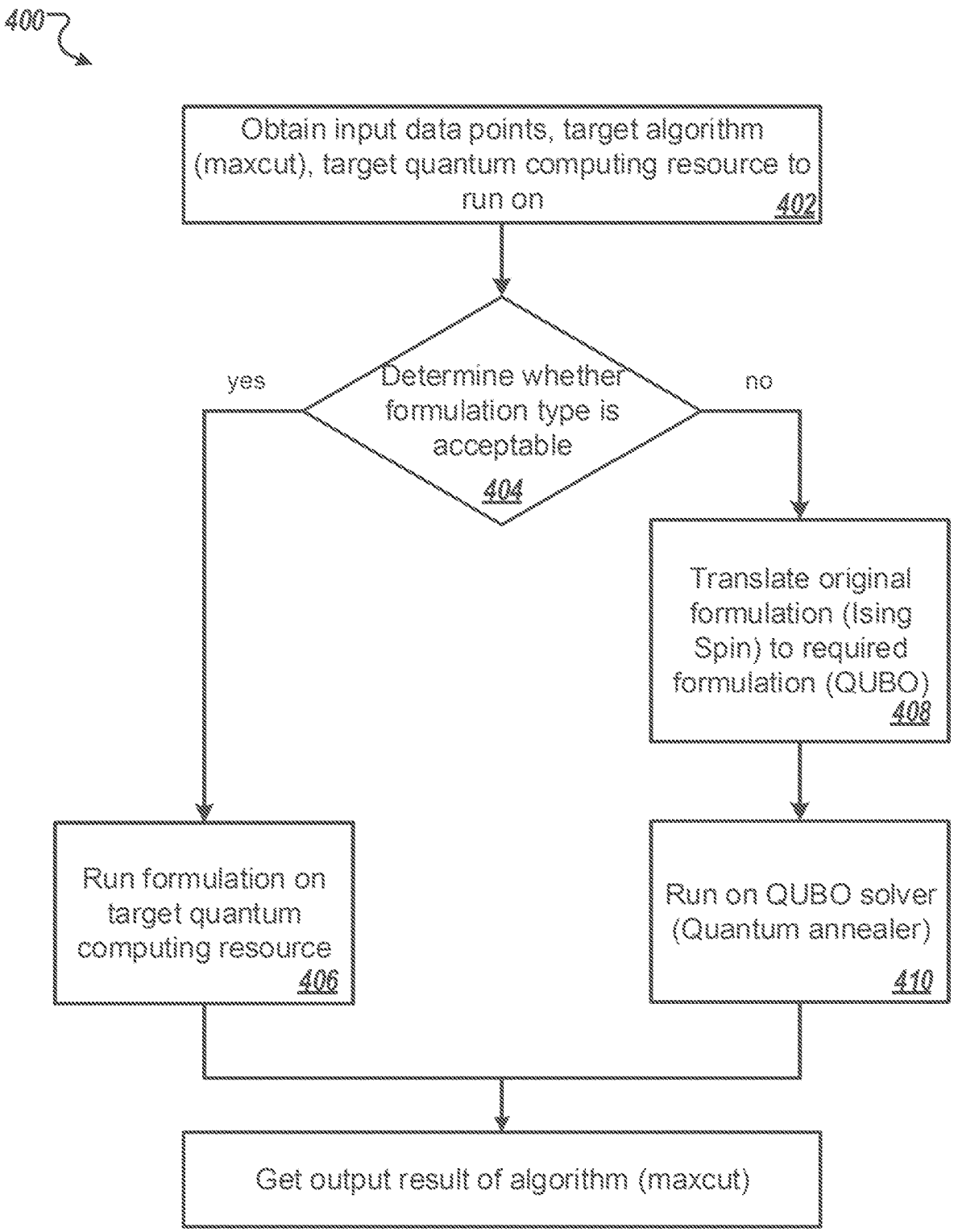
FIG. 4 is a flow diagram of an example process for performing a maxcut algorithm on quantum computing resources using different formulations.

FIG. 4 is a flow diagram of an example process 400 for deriving a formulation of the data representing the computational task that is formulated for a selected type of quantum computing resource. For convenience, the process 400 will be described as being performed by a system of one or more computers located in one or more locations. For example, a system for performing computational tasks, e.g., the system 100 of FIG. 1, appropriately programmed in accordance with this specification, can perform the process 400. As an example, the process is described as deriving a formulation of data representing a computational task to be performed using a maxcut algorithm.

In response to obtaining formulated data representing the computational task to be performed, data indicating that the target algorithm for performing the computational task is a maxcut algorithm, and data specifying a selected type of quantum computing resource to perform the computational task (step 402), the system determines whether the formulation type of the formulated data is included in the accepted formulation types for the selected type of quantum computing resource or not (step 404). For example, as described above with reference to FIG. 3, the system may access a quantum device formulation requirements database to identify acceptable formulation types for the selected type of quantum computing device. Optionally the system may also determine whether the formulation type of the formulated data is an optimal formational for an accepted formulation type for the selected type of quantum computing resource.

In response to determining that the formulation type of the data representing the computational task to be performed is included in the accepted formulation types (and optionally is an optimal formulation), the system provides the formulated data to the selected quantum computing resource (step 406). Optionally, the system may adjust the formulated data based on the obtained data representing accepted algorithm formulations before providing the formulated data to the selected quantum computing resource. For example, the system may optimize the formulated data.

In response to determining that the formulation type of the data representing the computational task to be performed is not included in the accepted formulation types (and/or is not an optimal formulation) or not, the system selects, by a formulation selector, a new formulation of the data representing the computational task based on the obtained data representing accepted formulation types and algorithm formulations (and optionally data representing optimal formulation types and algorithm formulations) (step 408). For example, if the formulation type of the obtained data is an Ising formulation, but Ising formulations are not accepted by the target quantum computing resource, e.g., an annealer, the system may select an alternative formulation type that is accepted by the target quantum computing resource, e.g., a quadratic unconstrained binary optimization formulation.

The system then provides the newly formulated data to the selected quantum computing resource (step 410). Optionally, the system may adjust the newly formulated data based on the obtained data representing accepted algorithm formulations before providing the newly formulated data to the selected quantum computing resource. For example, the system may optimize the newly formulated data.

The system obtains an output result of the algorithm from the selected quantum computing resource (step 412).

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer implemented method comprising:
   receiving, at a quantum formulation solver, data that represents a computational task to be performed, the data being independent of a formulation or of a particular quantum computing resource;
   identifying, by the quantum formulation solver, the particular quantum computing resource as being available;
   obtaining, by the quantum formulation solver and from a quantum device formulation requirements database that stores data indicating accepted formulation types for different types of quantum computing resources, data indicating accepted formulation types for the particular quantum computing resource, wherein the accepted formulation types stored in the quantum device formulation requirements database for one type of quantum computing resource generate higher quality outputs when solved by the one type of quantum computing resource than when solved by another type of quantum computing resource;
   obtaining, by the quantum formulation solver and from a quantum algorithm and formulations database, data representing algorithm formulations of the accepted formulation types;
   selecting, by the quantum formulation solver, a formulation of the data for the particular quantum computing resource, the formulation representing the computational task based on the obtained data representing accepted formulation types and algorithm formulations;
   and
   routing, by the quantum formulation solver, the formulation of the data representing the computational task to the selected available quantum computing resource to obtain data representing a solution to the computational task.

2. The method of claim 1, wherein the formulation of the data representing the computational task comprises an Ising spin formulation, quadratic unconstrained binary optimization formulation, polynomial unconstrained binary optimization formulation, p-spin formulation, or a quantum logic gate formulation.

3. The method of claim 1, wherein the computational task comprises an optimization task, simulation task, machine learning task, arithmetic task, database search task or data compression task.

4. The method of claim 1, wherein the different types of quantum computing resources comprise (i) quantum gate computers, (ii) quantum annealers, or (iii) quantum simulators.

5. The method of claim 1, wherein selecting one of the available quantum computing resources comprises:
   determining properties of the available quantum computing resources, wherein the properties comprise (i) computational times associated with solutions generated by the identified one or more available quantum computing resources, (ii) computational costs associated with solutions generated by the identified one or more available quantum computing resources, or (iii) approximate qualities of solutions generated by the identified one or more available quantum computing resources; and
   selecting an available quantum computing resource based on the determined properties.

6. The method of claim 1, wherein the data representing the computational task to be performed is independent of a formulation or particular quantum computing resource.

7. The method of claim 1, further comprising optimizing, by a formulation optimizer, the derived formulation of the data representing the computational task.

8. The method of claim 1, further comprising generating output data including data representing a solution to the computational task, comprising converting, by a solution conversion module, the data representing the solution to the computational task.

9. A system comprising one or more computers and one or more storage devices storing instructions that are operable, when executed by the one or more computers, to cause the one or more computers to perform operations comprising:
receiving, at a quantum formulation solver, data that represents a computational task to be performed, the data being independent of a formulation or of a particular quantum computing resource;
identifying, by the quantum formulation solver, the particular quantum computing resource as being available;
obtaining, by the quantum formulation solver and from a quantum device formulation requirements database that stores data indicating accepted formulation types for different types of quantum computing resources, data indicating accepted formulation types for the particular quantum computing resource, wherein the accepted formulation types stored in the quantum device formulation requirements database for one type of quantum computing resource generate higher quality outputs when solved by the one type of quantum computing resource than when solved by another type of quantum computing resource;
obtaining, by the quantum formulation solver and from a quantum algorithm and formulations database, data representing algorithm formulations of the accepted formulation types;
selecting, by the quantum formulation solver, a formulation of the data for the particular quantum computing resource, the formulation representing the computational task based on the obtained data representing accepted formulation types and algorithm formulations;
and
routing, by the quantum formulation solver, the formulation of the data representing the computational task to the selected available quantum computing resource to obtain data representing a solution to the computational task.

10. The system of claim 9, wherein the formulation of the data representing the computational task comprises an Ising spin formulation, quadratic unconstrained binary optimization formulation, polynomial unconstrained binary optimization formulation, p-spin formulation, or a quantum logic gate formulation.

11. The system of claim 9, wherein the computational task comprises an optimization task, simulation task, machine learning task, arithmetic task, database search task or data compression task.

12. The system of claim 9, wherein the different types of quantum computing resources comprise (i) quantum gate computers, (ii) quantum annealers, or (iii) quantum simulators.

* * * * *